United States Patent [19]

Lutz

[11] 3,738,774
[45] June 12, 1973

[54] ASPHALT MIXER TIP AND SHANK ASSEMBLY

[76] Inventor: Kenneth V. Lutz, 19782 Glen Brae Drive, Saratoga, Calif. 95070

[22] Filed: Dec. 16, 1971

[21] Appl. No.: 208,817

[52] U.S. Cl. .............................. 416/210, 416/222
[51] Int. Cl. ............................................. B01f 7/04
[58] Field of Search ................. 416/210, 211, 207, 416/204, 222; 259/109, 178

[56] References Cited
UNITED STATES PATENTS
2,727,732  12/1955  Plumb et al. ................. 416/207 X
3,614,262  10/1971  Lutz ................................. 416/224

*Primary Examiner*—Everette A. Powell, Jr.
*Attorney*—Jack M. Wiseman

[57] ABSTRACT

An asphalt mixer tip and shank assembly in which a pugmill shank is secured midway between its ends to a mixer shaft. The shank comprises a separable hub with complementary shaft gripping hub halves clamped to the mixer shaft by bolts interengaging the separable members. A mixer tip is detachably secured at each end of the shank. Each mixer tip is formed with an ear and a recessed portion to receive the distal end of its associated separable member of the shank and is secured to the shank by a pin passing through the ear to urge the shank into the recessed portion of the mixer tip in fixed relation thereto. A slip-on shroud is mounted on each end of the shank.

16 Claims, 12 Drawing Figures

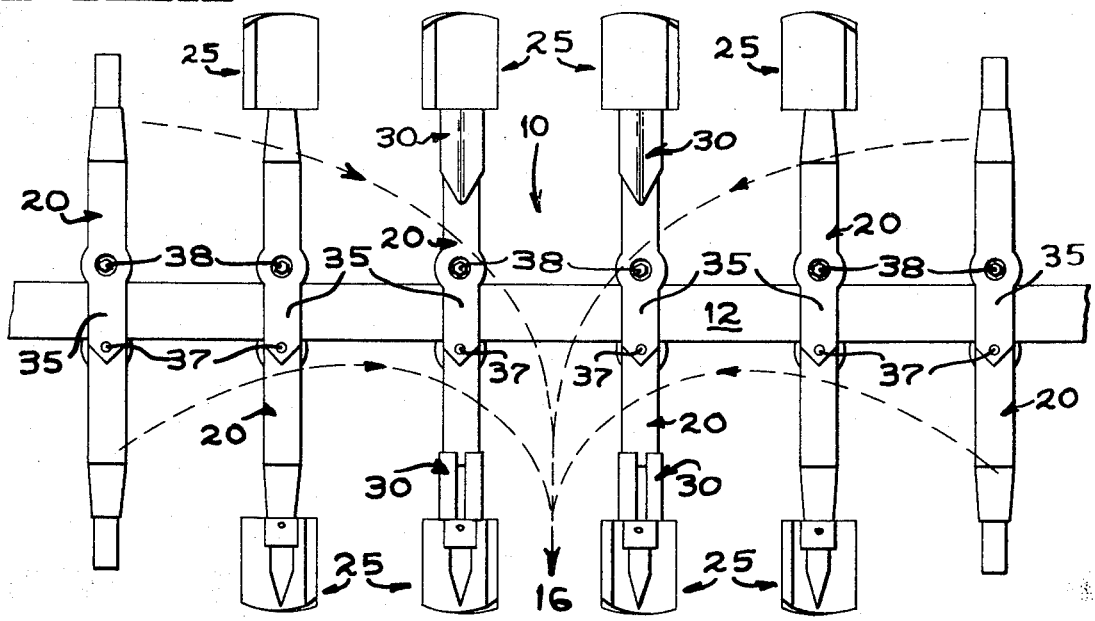
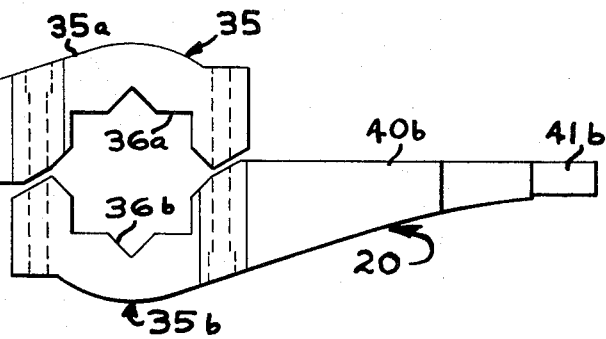
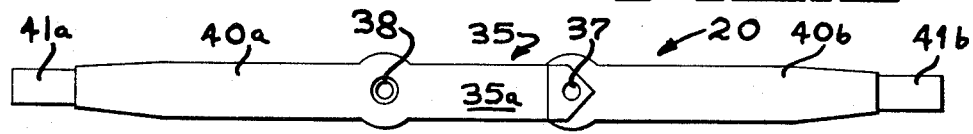
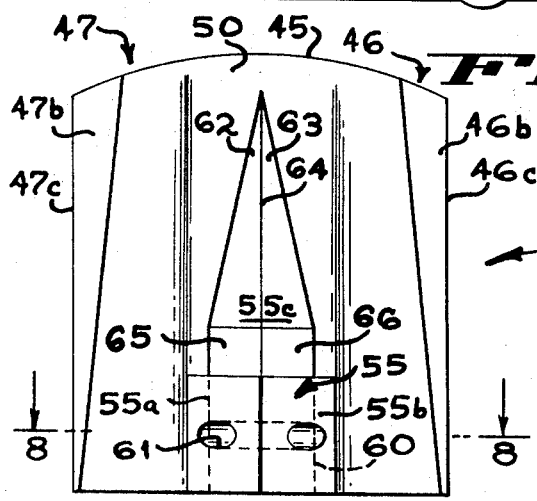
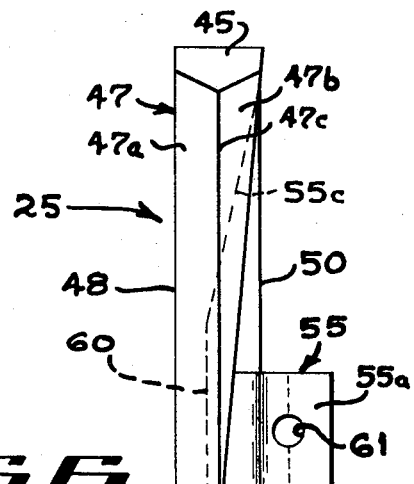

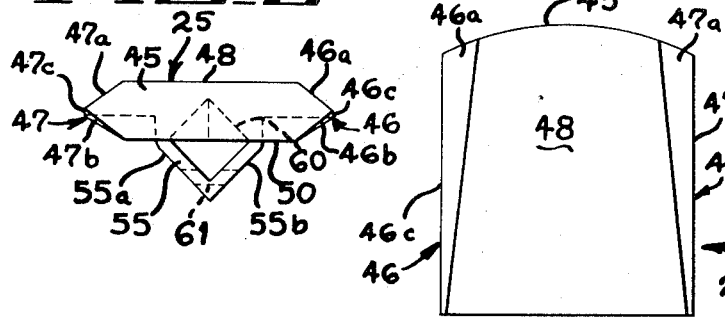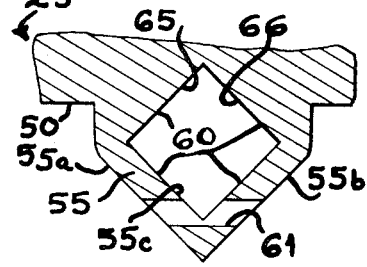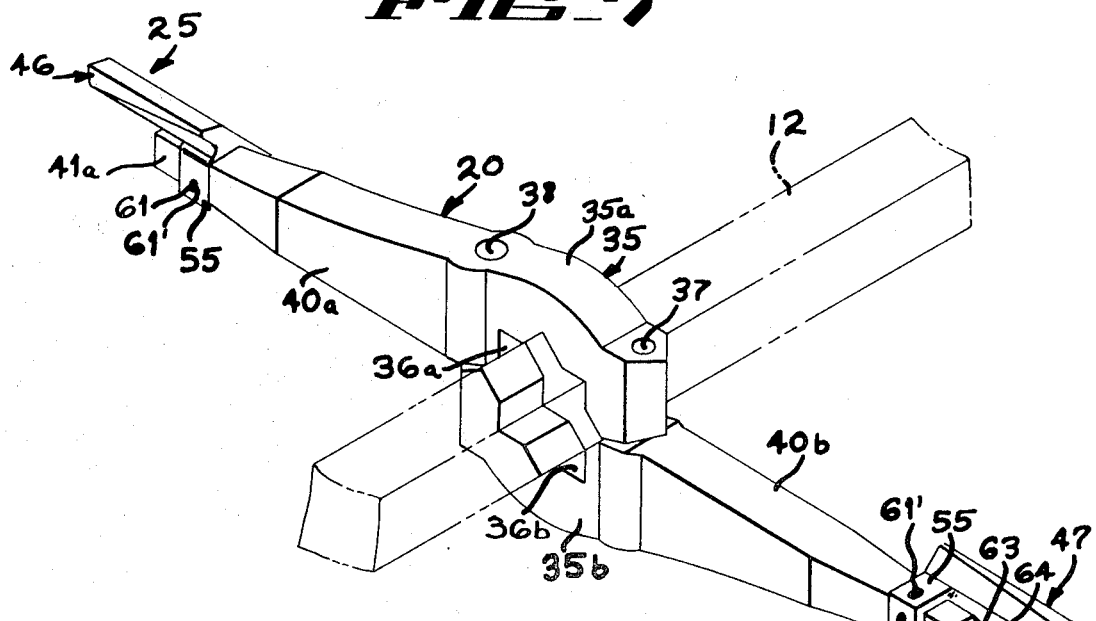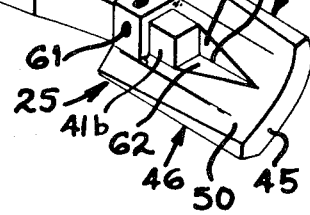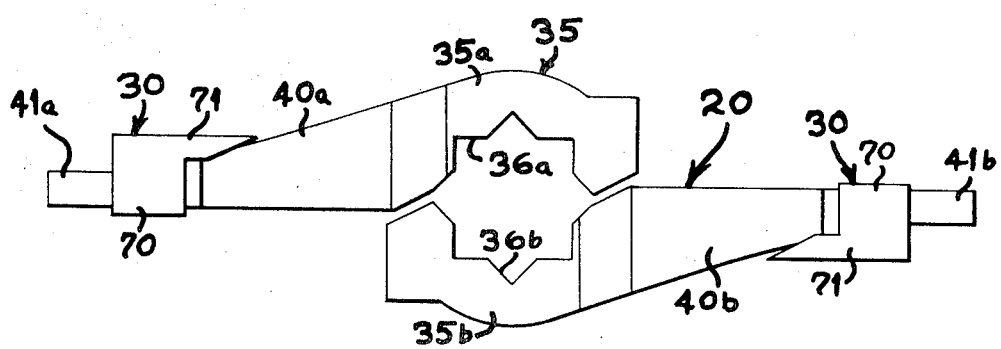

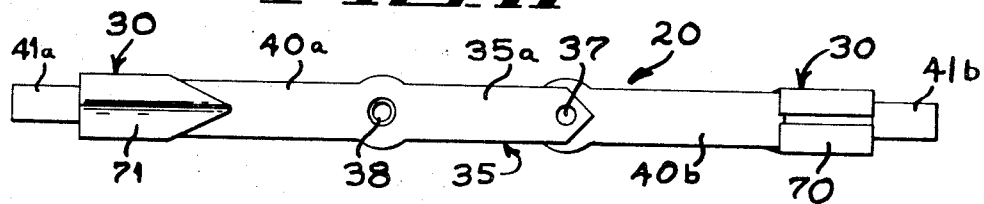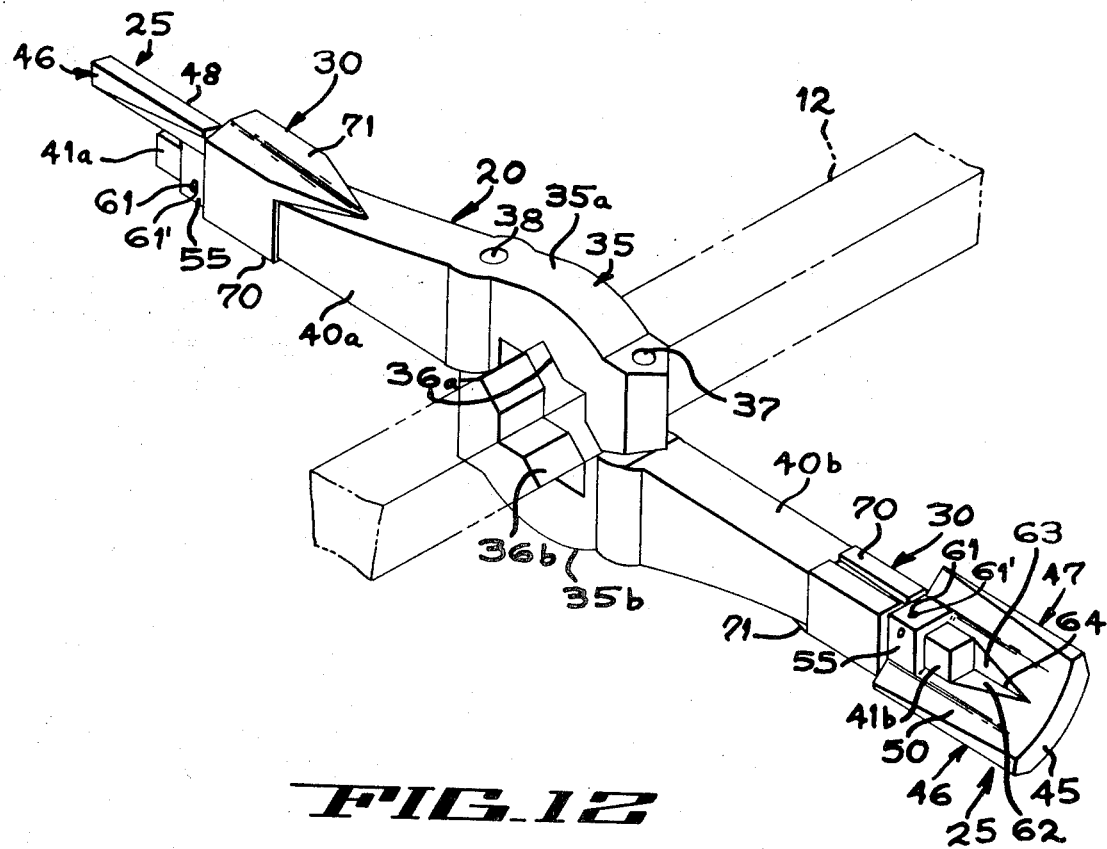

ASPHALT MIXER TIP AND SHANK ASSEMBLY

BACKGROUND OF THE INVENTION

The present invention relates in general to asphalt mixers and more particularly to a pugmill shank and mixer tip assembly.

Heretofore, shanks were designated either left hand shanks or right hand shanks. Such shanks were not interchangeable. While interchangeable mixer tips were disclosed in the patent to K. V. Lutz, U.S. Pat. No. 3,614,262, issued on Oct. 19, 1971, for Asphalt Mixer Tips and in the British patent to Braham Brown Limited, No. 339,584, accepted on Dec. 11, 1930, for Improvements In Mixers For Road Materials and the Like, such mixer tips were mounted on either a right hand shank or a left hand shank. The British Pat. No. 339,584 and the patent to Guedel U.S. Pat. No. 1,555,964, issued on Oct. 6, 1925, for Blade For Asphalt And The Like Mixers disclose shanks clamped to mixer shafts.

SUMMARY OF THE INVENTION

A mixer tip comprising an ear and a confronting recessed portion to receive a shank. A pin received by the ear urges the shank into fixed relation with the mixer tip.

A shank for attachment to a mixer shaft having a distal end received by an opening in a mixer tip formed by an ear and a confronting recess portion.

By virtue of the present invention, both the mixer tip and the shank are interchangeably useable either as a right hand or a left hand member.

A shroud that slips onto the distal end of the shank and is retained thereon by a mixer tip, which is usable on either a right hand or a left hand shank.

The present invention has reduced the wear and tear on parts to make the assembly more durable and longer lasting.

DESCRIPTION OF THE DRAWINGS

FIG. 1 is a fragmentary, diagrammatic elevation view of a mixer shaft with associated shanks, mixer tips and shrouds of an asphalt mixer plant embodying the present invention.

FIG. 2 is a side elevation view of the shank embodying the present invention.

FIG. 3 is a plan view of the shank shown in FIG. 2.

FIG. 4 is a side elevation view of the mixer tip embodying the present invention.

FIG. 5 is a plan view of the mixer tip shown in FIG. 4.

FIG. 6 is an end elevation view of the mixer tip shown in FIGS. 4 and 5.

FIG. 7 is another side elevation view of the mixer tip shown in FIGS. 4-7.

FIG. 8 is a horizontal section view taken along line 8—8 of FIG. 4.

FIG. 9 is a perspective view of the shank mounted on the mixer shaft and the mixer tips mounted on the distal ends of the shank.

FIG. 10 is a side elevation view of the shank illustrated with slip-on shrouds embodying the present invention mounted thereon.

FIG. 11 is a plan view of the shank illustrated with the shrouds shown in FIG. 11 mounted thereon.

FIG. 12 is a perspective view of the shank mounted on the mixer shaft and the mixer tips and slip-on shrouds mounted on the distal ends of the shank.

DESCRIPTION OF THE PREFERRED EMBODIMENT

Illustrated in FIG. 1 is a rotor 10 which is employed as an asphalt mixer for mixing ingredients of aggregate and liquid asphalt or other cementing material commonly found in asphalt mixing plants. The rotor 10 includes a drive shaft 12 with a plurality of shanks 20 of the present invention clamped thereto and projecting radially therefrom.

For explanation purposes, it may be viewed that the dotted lines in FIG. 1 represent the path of the mixture travelling toward an exit 16, at which point the mixture is to be discharged after the mixing operation is completed. The shanks 20 are universal or interchangeable and may be used either as a right hand shank or a left hand shank. For purposes of illustration only, only the end shanks 20 are shown without pugmill tips or shrouds. The intermediate shanks 20 are shown with pugmill tips 25 of the present invention. The center shanks 20 are complete with the mixer tips 25 and slip-on shrouds 30 of the present invention.

In operation, it is desirable that the rotor 10 simultaneously mix the liquid asphalt and aggregate while urging the mixture toward the exit 16. The mixer tips 25 are universal or interchangeable and can be used either as a right hand pugmill tip or a left hand pugmill tip. The slip-on shrouds 30, which are also universal or interchangeable, protect the shanks 20 against excessive wear from the abrasive action of the mixing material.

Illustrated in FIGS. 2 and 3 is the shank 20 of the present invention which comprises a separable hub 35 having detachable hub halves 35a and 35b. Confronting recessed portions 36a and 36b of the hub halves 35a and 35b, respectively, form complementary jaws for gripping the drive shaft 12. In the preferred embodiment, the cross-sectional area of the drive shaft is square or quadrature and the walls of the recesses 36a and 36b are shaped to accommodate a shaft with a square cross-sectional area. Angular adjustment of the shanks 20 on the shaft 12 can be made through the angular configuration of the walls of the recesses 36a and 36b. Suitable bolts and nuts 37 and 38 interengage complementary hub halves 35a and 35b and clamp the shanks 20 in fixed relation to the drive shaft 12 for rotation therewith. The nuts 38 are seated in recessed areas of the hub 35 to reduce the wear and tear thereon resulting from the abrasive action of the mixing ingredients.

Projecting radially outward from the hub half 35a is a shank blade 40a that is formed integrally therewith. In a similar manner, projecting radially outward from the hub half 35b is a shank blade 40b formed integrally therewith. The shank blades 40a and 40b reduce in cross-sectional area as the blades progress from the proximal end to the distal end 41a and 41b. At the distal ends 41a and 41b of the shank blades 40a and 40b, respectively, the cross-sectional areas are square or quadrature.

Illustrated in FIGS. 4-8 is the mixer tip 25 of the present invention which comprises an arcuate top wall 45. Extending from the top wall 45 are end walls 46 and 47. It is the end walls 46 and 47 that provide the leading and trailing edges. The end wall 46 includes a pair of tapered surfaces 46a and 46b that meet at a crown 46c, and the end wall 47 includes a pair of tapered surfaces 47a and 47b that meet at a crown 47c. A smooth front wall 48 joins the end walls 46 and 47. A rear wall 50 also joins the end walls 46 and 47, and is disposed in parallel with the front wall 48.

The rear wall 50 has projected outwardly therefrom an integrally formed ear 55 which includes angularly disposed walls 55a and 55b (FIGS. 3 and 8). The ear 55 is formed with a recess 55c that is defined by angularly disposed walls that are right angle to one another. The walls defining the recess 55c are parallel with the walls 55a and 55b. Formed in the rear wall 50 is a recess 60 that confronts the recess 55c and is defined by angularly disposed walls that are right angle to one another. The cross-sectional area of the recess 55c and 60 are square or quadrature and receive the distal end of the shank blade. As previously described, the distal end of the shank blade has a square or quadrature cross-sectional area. A bore 61 is formed in the ear 55 and passes through the walls 55a and 55b. A suitable spring steel roll pin 61' is received by the bore 61 and expands to fix the mixer tip 25 to the shank 20.

The rear wall 50 is also formed with centrally located recessed, tapered walls 62 and 63 that join in a vertex 64. Intermediate the ear 55 and the walls 62 and 63 are recessed, right angle walls 65 and 66. The rear wall 50 is thus streamlined with smooth connecting surfaces to reduce friction and wear and tear.

The slip-on shroud 30 (FIGS. 10 and 11) is placed on the distal ends of the shank 20 to protect the same against excessive wear and tear. The shroud 30 comprises a sleeve 70 that slips onto the distal end of the shank 20 and slideably engages the blade of the shank. The opening of the sleeve 70 is of a size to receive the distal end of the shank. The shroud 30 is limited to the extent of movement toward the proximal end of the shank by the tapered walls of the blade of the shank. Spaced bottom walls of the sleeve 70 provide guiding and retaining flanges for the slide-on movement. Integrally formed with the sleeve 70 is a longitudinally extending wall 71 that serves to protect the shank against the abrasive action of the mixing materials.

In use, the blades 40a and 40b are placed with the recesses 36a and 36b of the hub halves 35a and 35b confronting the drive shaft 12 and with the walls of the recesses 36a and 36b embracing in clamping engagement the drive shaft 12. Bolts 37 and nuts 38 secure the hub halves 35a and 35b together to secure the shank 20 in fixed relation to the drive shaft 12 for rotation therewith.

Now, the slip-on shrouds are placed on the distal ends of the shank 20. The mixer tips 25 are then secured to the distal ends of the shank 20. Toward this end, the distal ends 41a and 41b of the shank 20 are received respectively by ears 55 of the mixer tips 25 and by confronting recesses 60 of the mixer tips 25. After the mixer tips 25 are mounted on the shank 20, the roll pins 61' are inserted into the ears 55 for securing the mixer tips 25 to the shank 20. The mixer tips retain the shrouds 30 on the shanks 20.

I claim:

1. A mixer assembly for attachment to a drive shaft comprising:
   a. a shank comprising a hub for receiving the drive shaft to mount said shank on the drive shaft for rotation therewith, and a blade projecting radially outward from said hub, said blade having a distal end; and
   b. a mixer tip comprising an ear, said ear being formed with an opening extending in the general direction of said mixer tip for receiving the distal end of said blade, and means on said mixer tip urging said mixer tip in fixed relation with said blade for rotation with said shank,
   c. said mixer tip being formed with a recessed portion confronting said ear, said opening in said ear being a recess confronting said recessed portion, said distal ends of said blade being received by said recessed portion and said recess of said ear, said recessed portion being formed with right angular walls and said recess of said ear being defined by right angular walls and said distal end of said blade being formed with a contour conforming to the configuration of said walls.

2. A mixer tip as claimed in claim 1 and comprising a slip-on shroud mounted on said shank, said shroud comprising a sleeve for receiving the distal end of said blade, said mixer tip being disposed radially outward of said shroud for retaining said shroud on said shank.

3. A mixer assembly as claimed in claim 1 wherein the recess of said recessed portion and said recess of said ear are complementary and define a quadrature cross-sectional area and wherein the distal end of said blade has a quadrature cross-sectional area.

4. A mixer assembly as claimed in claim 1 wherein said shank comprises a second blade projecting radially outward from said hub, said hub being separable to form detachable first and second hub halves, said blade projecting from said first hub half and said second blade projecting from said second hub half, and comprising means interengaging said first and second hub halves to urge said first and second hub halves into clamping engagement with the drive shaft for securing said shank to said drive shaft.

5. A mixer assembly as claimed in claim 4 wherein said first and second hub halves include confronting recesses defined by right angular walls for receiving the drive shaft.

6. A mixer tip comprising:
   a. a top wall;
   b. end walls extending from said top wall;
   c. a front wall disposed between said end walls; and
   d. a rear wall disposed between said end walls, said rear wall comprising an ear projecting outwardly therefrom, said ear being formed with an opening for receiving the end of a blade extending in the general direction of the mixer tip,
   e. said rear wall being formed with a recessed portion confronting said ear, said opening in said ear being a recess confronting said recessed portion, the end of the blade being received by said recessed portion and said recess of said ear, said recessed portion being formed with right angular walls and said recess of said ear being defined by right angular walls.

7. A mixer tip as claimed in claim 6 and comprising means on said ear for urging the blade in fixed relation with the mixer tip.

8. A mixer tip as claimed in claim 7 wherein said means is a pin of expansible material.

9. A mixer tip as claimed in claim 7 wherein the recess of said recessed portion and said recess of said ear are complementary and define a quadrature cross-sectional area.

10. A mixer assembly as claimed in claim 1 wherein said means on said mixer tip urging said mixer tip in fixed relation with said blade for rotation with said shank is a pin of expansible material.

11. A mixer assembly for attachment to a drive shaft comprising:
   a. a shank comprising a hub for receiving the drive shaft to mount said shank on the drive shaft for rotation therewith, and a blade projecting radially outward from said hub, said blade having a distal end; and
   b. a mixer tip comprising a first wall, said first wall being formed with an opening extending in the general direction of said mixer tip for receiving the distal end of said blade, and means on said mixer tip urging said mixer tip in fixed relation with said blade for rotation with said shank,
   c. said mixer tip being formed with a recessed portion in a second wall confronting said first wall, said opening in said first wall being a recess confronting said recessed portion in said second wall, said distal ends of said blade being received by said recessed portion of said second wall and said recess of said first wall, said recessed portion of said second wall being formed with right angular walls and said recess of said first wall being defined by right angular walls and said distal end of said blade being formed with a contour conforming to the configuration of said right angular walls.

12. A mixer tip comprising:
   a. a top wall;
   b. end walls extending from said top wall;
   c. a front wall disposed between said end walls; and
   d. a rear wall disposed between said end walls, said rear wall being formed with an opening for receiving the end of a blade extending in the general direction of the mixer tip,
   e. said rear wall being formed with a recessed portion confronting said opening, the end of the blade being received by said recessed portion and said opening, said recessed portion being formed with right angular walls and said opening being defined by right angular walls.

13. A mixer assembly as claimed in claim 11 wherein said means on said mixer tip urging said mixer tip in fixed relation with said blade for rotation with said shank is a pin of expansible material.

14. A mixer tip as claimed in claim 13 and comprising a pin of expansible material on said rear wall for urging the blade in fixed relation with said mixer tip.

15. A mixer assembly as claimed in claim 11 wherein said means on said mixer tip urging said mixer tip in fixed relation with said blade for rotation with said shank is a pin disposed at right angles to said blade and said mixer tip.

16. A mixer tip as claimed in claim 11 and comprising a pin on said rear wall disposed at right angles to said mixer tip for urging the blade in fixed relation with said mixer tip.

* * * * *